US005616871A

United States Patent [19]

Kenney

[11] Patent Number: 5,616,871

[45] Date of Patent: Apr. 1, 1997

[54] PIPET GUN ASSEMBLY

[75] Inventor: James W. Kenney, Broomall, Pa.

[73] Assignee: Drummond Scientific Company, Broomall, Pa.

[21] Appl. No.: 535,468

[22] Filed: Sep. 28, 1995

[51] Int. Cl.[6] .................................. G01N 1/14; B01L 3/02

[52] U.S. Cl. .............................................................. 73/864.14

[58] Field of Search ................................ 73/864.14, 863, 73/863.22, 864.01, 864.11, 864.12, 864.13, 864.15

[56] References Cited

U.S. PATENT DOCUMENTS

| | | | |
|---|---|---|---|
| 3,244,009 | 4/1966 | Tietje et al. | 73/864.14 |
| 4,210,724 | 7/1980 | Sogi et al. | 435/309.2 |
| 4,461,328 | 7/1984 | Kenney | 73/864.02 X |
| 4,511,534 | 4/1985 | Bennett, Jr. et al. | 73/864.11 X |
| 4,624,147 | 11/1986 | Kenney | 73/864.15 |
| 4,662,545 | 5/1987 | Kenney | 73/864.13 X |
| 4,744,955 | 5/1988 | Shapiro | 73/864.14 X |
| 4,933,148 | 6/1990 | Perlman | 73/864.14 X |
| 5,090,255 | 2/1992 | Kenney | 73/864.18 X |
| 5,364,595 | 11/1994 | Smith | 73/864.11 X |
| 5,406,856 | 4/1995 | Kühn | 73/864.14 |

*Primary Examiner*—Thomas P. Noland
*Attorney, Agent, or Firm*—John F. A. Earley; John F. A. Earley, III

[57] ABSTRACT

A pipet gun assembly with a handle and a barrel extending from the handle and a pipet stand, wherein a pipet tube connected to the barrel is supported upright by the base of the handle and the stand connected to the barrel so that the pipet tube does not touch anything and can remain sterile. The pipet tube is supported with its admitting-emitting end below the level of its connecting end that is connected to the pipet gun so that any liquid in the pipet tube does not flow back through the tube and into the pipet gun.

9 Claims, 2 Drawing Sheets

PIPET GUN ASSEMBLY

BACKGROUND OF THE INVENTION

1. Technical Field

This invention relates to the field of pipet guns for drawing a measured amount of liquid into a calibrated pipet tube, and for dispensing measured amounts, or aliquots, of the liquid from the pipet tube into a number of wells on a tray for subsequent testing. More particularly, the invention relates to a pipet gun assembly which includes a pipet gun and a stand which permits the pipet gun assembly to be set down on a bench top or table top without the pipet tube touching the bench or table top so as to avoid contamination if the pipet tube is sterile, and without the liquid in the pipet tube running back in the pipet tube into the pipet gun.

2. Related Inventions

This invention is related to my inventions disclosed in U.S. Pat. No. 5,090,255 which issued on Feb. 25, 1992; U.S. Pat. No. 4,624,147 which issued on Nov. 25, 1986; U.S. Pat. DES. 242,729 which issued Dec. 14, 1976; U.S. Pat. No. 3,963,061 which issued on Jun. 15, 1976; and U.S. Pat. No. 3,834,240 which issued on Sep. 10, 1974; all of these patents being assigned to Drummond Scientific Company, Broomall, Pennsylvania, and all of which are incorporated herein by reference.

BACKGROUND OF THE PRIOR ART

The present pipet gun assembly is an improvement over the prior art in that during its operation of filling the tube with a predetermined amount of liquid, or during its operation of dispensing aliquots of the liquid into wells in a tray, the pipet gun assembly may be set down on a table top or on a bench top without the pipet tube touching the bench or table top so as to maintain its sterility, and with the pipet tube at such an attitude that the admitting-emitting end is lower than the connecting end that connects to the pipet gun so that the liquid in the pipet tube does not run back through the tube and into the pipet gun. These advantages of this pipet gun assembly are important. For example, if the operator of the pipet gun receives a telephone call and must put down the pipet gun in order to answer the telephone call, he can do so. Of course, this invention enables the operator to put down the pipet gun whenever he is interrupted, whether it be by a telephone call or by other interruptions.

BRIEF SUMMARY OF THE INVENTION

It is an object of this invention to provide a piper gun assembly which enables an operator to put down the pipet gun on a table top or bench top without touching the bench or table top with the calibrated pipet tube, which may be sterile, and without having the liquid in the tube run back through the tube and into the pipet gun.

The objects of this invention are accomplished by providing a pipet gun having a barrel extending from a handle, and a support stand connected to the pipet gun for holding the pipet gun upright on the top surface of a work bench with the barrel of the gun upright at an angle from the vertical and not touching the work bench, with a pipet tube extending from the barrel and not touching the work bench, and with the attitude of the pipet tube being such that the admitting-emitting end of the tube is below the level of the connecting end of the tube which connects the tube to the gun, so that any liquid in the tube does not go back through the tube and into the pipet gun.

DETAILED DESCRIPTION OF THE DRAWINGS

Figure 1:
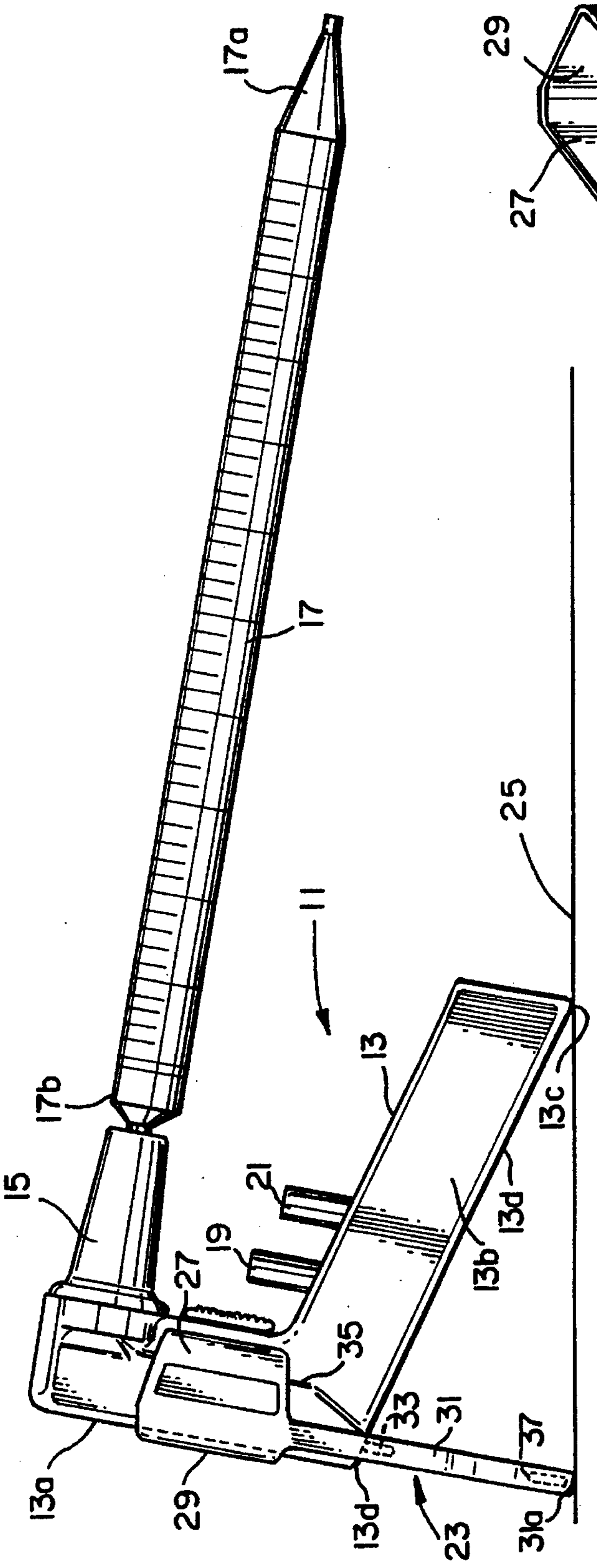
FIG. 1 is a view in side elevation of the pipet gun assembly constructed in accordance with the invention.
Figure 2:
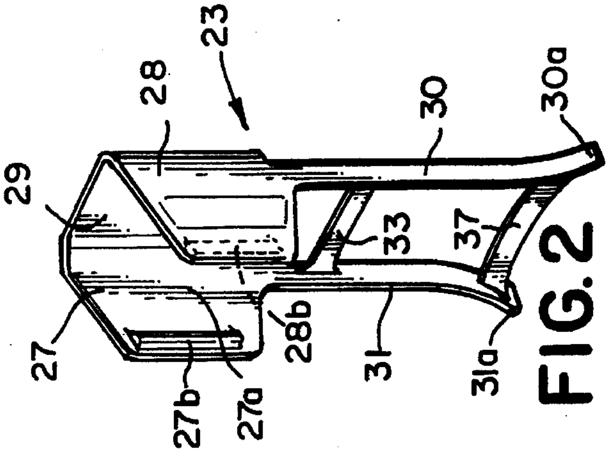
FIG. 2 is a view in perspective of a pipet stand which forms an element of the invention.
Figure 3:
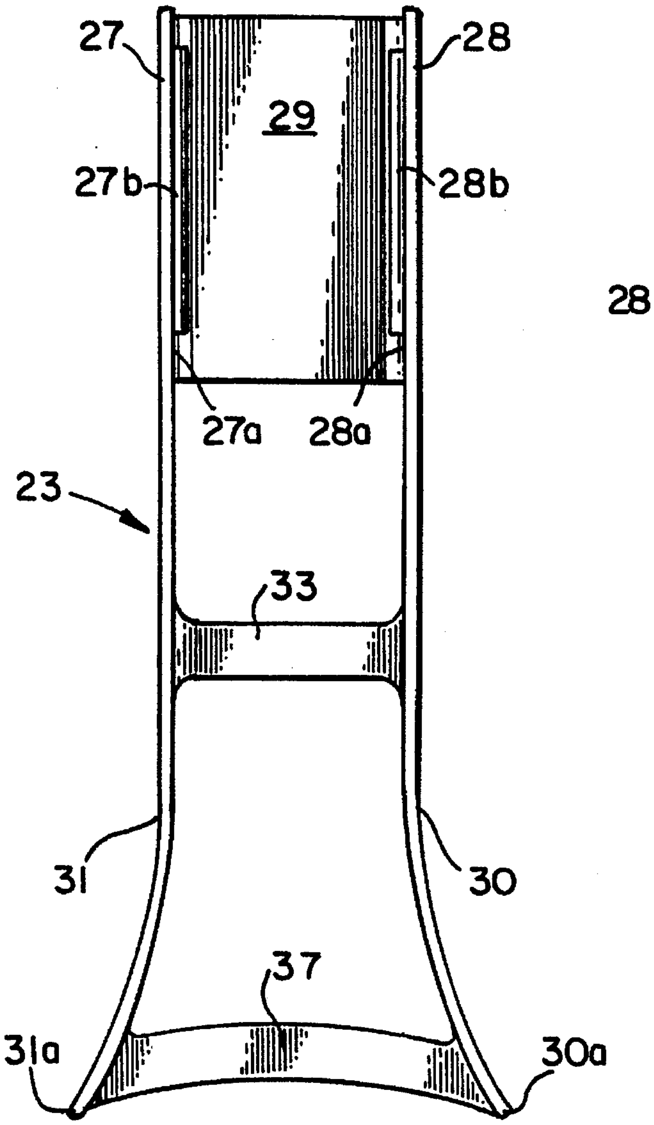
FIG. 3 is a view in front elevation of the pipet stand shown in FIG. 2.
Figure 4:
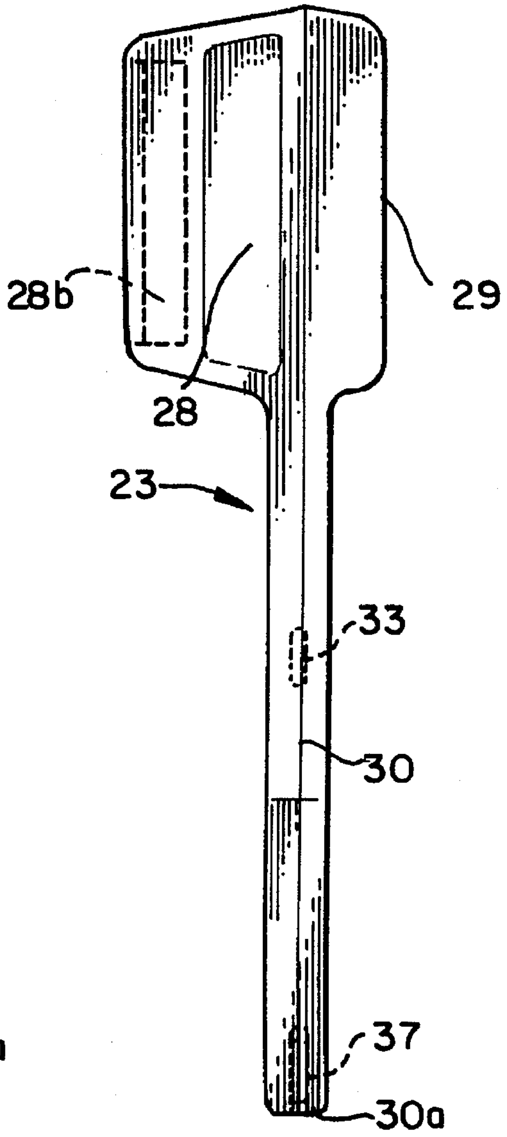
FIG. 4 is a view in side elevation of the pipet stand of FIG. 3.
Figure 5:
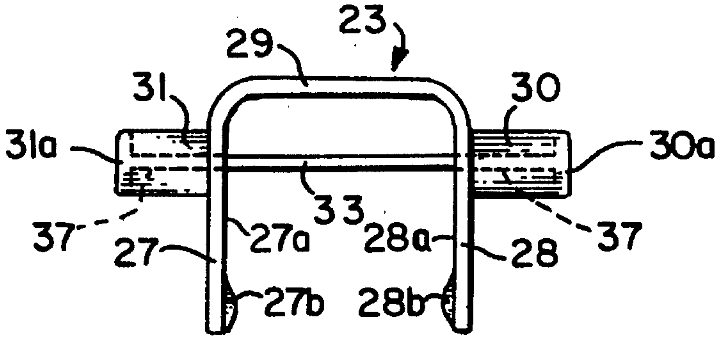
FIG. 5 is a view in top plan of the pipet stand of FIG. 3.

Turning now to the drawings, there is shown a pipet gun assembly 11 which comprises a pipet gun 13 with a barrel **13*a* extending from a handle 13*b***.

The pipet gun 13 also includes a connector 15 for attaching a pipet tube 17 to the pipet gun 13. A vacuum button 19 actuates a vacuum source to draw liquid into the pipet tube 17, and an air valve button 21 actuates an air source to dispense aliquots of liquid from the pipet tube 17 into a series of wells for testing.

A pipet support stand 23 is provided that may be releasably connected to the pipet gun 13 for holding the pipet gun 13 upright on a top surface 25 of a work bench or table with the barrel **13*a* of the gun 13 pointing upwardly at an angle from the vertical so that the pipet tube 17 is pointed downwardly from the horizontal. The barrel 13 does not touch the top surface 25 of the work bench, and the pipet tube 17 mounted on the pipet gun 13 does not touch the top surface 25** of the work bench, and therefore remains sterile.

The pipet tube 17 has an admitting-emitting tip end **17*a*, and a connecting end 17*b* which is connected to and mounted on the barrel 13*a* by connector 15. The pipet tube 17 extends from the barrel 13*a*, when the pipet gun 13 is being supported upright by the support stand 23 and the heel or base 13*c* of the handle 13*b*, at an attitude such that the tip or admitting-emitting end 17*a* of the tube is below the level of the connecting end 17*b* of the pipet tube 17 so that any liquid in the tube 17 does not flow back through the tube and into the pipet gun 13**.

When the pipet tube 17 is supported by the support stand 23 and the heel **13*c* of handle 13*b*, if the pipet tube 17 is sterile, it does not touch the top surface 25** of the work bench and remains sterile.

The stand 23 includes a pair of resilient clamping arms 27, 28 connected together by a back panel 29, and a pair of legs 30, 31 which extend downwardly from the clamping arms 27, 28 and flair outwardly to end in a pair of feet **30*a* and 31*a***.

A middle cross bar 33 connects the middle portion of the legs 30, 31 together for stability, and also acts as a stop for a rear wall **13*d* of the handle 13*b*. Middle cross bar 33 also sets the distance between rear wall 13*d* of the handle 13*b* and the feet 30*a*, 31*a* to hold the barrel 13*a* at the proper angle so that any pipet tube 17 mounted on the barrel 13*a* is held with its admitting-emitting tip end 17*a* being lower than the level of its connecting end 17*b* so that any liquid in the tube does not flow back through the tube 17 and into the pipet gun 13**.

The facing surfaces **27*a*, 28*a* of each clamping arm 27, 28 include a ridge 27*b*, 28*b* and the ridges 27*b*, 28*b* slide or snap into grooves 35 on barrel 13*a* which receive and seat the ridges 27*b*, 28*b* to connect the stand 23 to the barrel 13*a***.

The feet 30*a*, 31*a* of the legs 30, 31 form a tripod with the base or heel 13*c* of the handle 13*b*to hold the pipet gun 13 upright but off vertical.

In operation, the method of supporting a pipet gun 13 in an upright position and holding a pipet tube 17 so that it does not touch the surface of the work bench, and holding the pipet tube 17 at an attitude such that any liquid in the tube 17 does not flow back through the tube 17 and into the pipet gun 13, comprises the steps of providing a pipet gun 13 including a barrel 13*a* extending from a handle 13b, providing a pipet gun stand 23 which includes a pair of resilient clamping arms 27, 28 connected together by a back panel 29, a pair of legs 30, 31 extending downwardly from the clamping arms 27, 28 and flaring outwardly to a pair of feet 30*a*, 31*a*, a middle cross bar 33 which connects the middle portions of the legs 30, 31 together and acts as a stop for rear wall 13*d* of the handle 13*b* and sets the distance between the rear wall 13*d* of the handle 13*b* and the feet 30*a*, 31*a* to hold the barrel 13*a* at the proper angle so that any pipet tube 17 mounted on the barrel 13*a* is held with its admitting-emitting tip end 17*a* being lower than the level of its connecting end 17*b* so that any liquid in the tube 17 does not flow back through the tube 17 and into the pipet gun 13, and a bottom cross bar 37 connecting the feet 30*a*, 31*a* together to give the legs 30, 31 stability, the facing surface of each clamping arm 27, 28 including a ridge 27*b*, 28*b* and a pair of grooves 35 on the barrel 13*a* for receiving and seating said ridges 27*b*, 28*b* to connect the stand 23 to the barrel 13*a*. The method also includes the steps of mounting a pipet tube 17 onto the pipet gun 13, snapping or sliding the clamping arms 27, 28 of the stand 23 onto the pipet gun barrel 13*a* to form a pipet gun assembly 11, placing the pipet gun assembly 11 onto a top surface of a work table so that the pipet gun 13 is supported upright but off vertical by the stand 23 and the heel 13*c* of the pipet gun handle 13*b*, holding the pipet tube 17 at an attitude wherein the admitting-emitting tip end 17*a* of the tube 17 is below the level of the connecting end 17*b* of the tube 17 to prevent any liquid in the tube 17 from flowing back through the tube 17 into the pipet gun 13, and preventing contamination of the pipet tube 17 by holding and positioning the pipet gun 13 so that the pipet tube 17 does not touch the work table.

While the best mode of the invention has been shown and described herein, there are alternative embodiments of the invention.

1. The barrel of the pipet gun is provided with an integral extension which extends out from the rear of the barrel in the same position as the stand 23 shown in FIG. 1.

2. A flat piece of plastic material slips into two grooves in the barrel and are held there in retracted position until the flat piece of plastic material is needed as a stand, whereupon the flat piece of plastic material is pulled out of the grooves and is extended from the barrel in much the same way as the stand 23 as shown in FIG. 1.

3. Pocketed folding legs may be stored in the handle and may be extended to form a stand when needed.

4. Two steel legs retract into tracks in the barrel when not needed and are extended from the barrel and flair outwardly to serve as a stand when needed. The two steel legs may be separate, or they may be joined together at the upper end so as to be shaped like a U.

I claim:

1. A pipet gun assembly for supporting a pipet gun in an upright position on a work table and for holding a pipet tube so that it does not touch the work table and for holding the pipet tube at an attitude such that any liquid in the tube does not flow back through the tube and into the pipet gun, comprising a pipet gun including a handle with a rear wall, a barrel extending from the handle, and support stand means connected to the pipet gun for holding the pipet gun upright on a top surface of a work bench with the barrel of the gun being upright but at an angle from the vertical, said barrel not touching the work table, so that any pipet tube having a connecting end mounted on the pipet gun barrel does not touch the work table and any such pipet tube which is sterile does not touch the work table and remains sterile, and connecting means on the barrel for supporting a pipet tube having a connecting end connected to the barrel and an admitting-emitting tip end for admitting and emitting liquid samples, and for holding the pipet tube at an attitude such that the admitting-emitting tip end is below the level of the connecting end of the pipet tube to prevent any liquid in the tube from flowing back through the tube to the pipet gun.

2. A pipet gun assembly comprising a pipet gun including a barrel extending from a handle, and support stand means connected to the pipet gun for holding the pipet gun upright on a top surface of a work bench with the barrel of the gun being upright but at an angle from the vertical, said barrel not touching the work table, so that any pipet tube having a connecting end mounted on the pipet gun barrel does not touch the work table and any such pipet tube which is sterile does not touch the work table and remains sterile, a pipet tube having an admitting-emitting tip end and a connecting end mounted on the barrel, said pipet tube extending from the barrel, when the pipet gun is being supported upright by the support stand means, at an attitude such that the admitting-emitting tip end is below the level of the connecting end of the pipet tube so that any liquid in the tube does not flow back in the tube and into the pipet gun.

3. The pipet gun assembly of claim 2, the pipet tube being sterile and not touching the work table when the pipet gun is being supported upright by the support stand means.

4. The pipet gun assembly of claim 2, said support stand means including a stand, said stand having a pair of resilient clamping arms connected together by a back panel, each said clamping arm having a facing surface, a pair of legs extending downwardly from the clamping arms and flaring outwardly to a pair of feet, middle cross bar means for connecting the middle portions of the legs together and for acting as a stop for a rear wall of the handle and setting a distance between the rear wall of the handle and said feet to hold the barrel at such an angle that that said pipet tube mounted in the barrel is held with its admitting-emitting tip end being lower than the level of its connecting end so that any liquid in the tube does not flow back through the tube and into the pipet gun, and a bottom cross bar connecting said feet together to give the legs stability.

5. The pipet gun assembly of claim 4, the facing surface of each clamping arm including a ridge, and a pair of grooves on the barrel for receiving and seating said ridges to connect the stand to the barrel.

6. The pipet gun assembly of claim 4, with the feet of the stand forming a tripod with the base of the handle to hold the pipet gun upright.

7. A pipet gun assembly comprising a pipet gun including a barrel extending from a handle with a rear wall, and support stand means connected to the pipet gun for holding the pipet gun upright on a top surface of a work bench with the barrel of the gun upright at an angle from the vertical and not touching the work bench, so that any pipet tube having a connecting end mounted on the pipet gun barrel does not touch the work bench, and any such pipet tube which is sterile does not touch the work bench and remains sterile, a pipet tube having an admitting-emitting tip end and a connecting end mounted on the barrel, said pipet tube extending from the barrel, when the pipet gun is being supported upright by the support stand means, at an attitude such that the admitting-emitting tip end is below the connecting end of the pipet tube so that any liquid in the tube does not flow back in the tube and into the pipet gun, the pipet tube being sterile and not touching the work bench when the pipet gun is being supported upright by the support stand means, said support stand means including a stand, said stand having a pair of resilient clamping arms connected together by a back panel, each said clamping arm having a facing surface, a pair of legs extending downwardly from the clamping arms and flaring outwardly to a pair of feet, middle cross bar means for connecting the middle portions of the legs together and for acting as a stop for a rear wall of the handle and setting a distance between the rear wall of the handle and said feet to hold the barrel at such an angle that said pipet tube mounted in the barrel is held with its admitting-emitting tip end being lower than the level of its connecting end so that any liquid in the tube does not flow back through the tube and into the pipet gun, and a bottom cross bar connecting said feet together to give the legs stability, the facing surface of each clamping arm including a ridge, and a pair of grooves on the barrel for receiving and seating said ridges to connect the stand to the barrel.

8. A method of supporting a pipet gun in an upright position on a work table and holding a pipet tube so that it does not touch the work table, and holding the pipet tube at an attitude such that any liquid in the tube does not flow back through the tube and into the pipet gun, comprising providing a pipet gun including a barrel extending from a handle with a rear wall, providing a pipet gun stand means including a stand, said stand having a pair of resilient clamping arms connected together by a back panel, each said clamping arm having a facing surface, a pair of legs extending downwardly from the clamping arms and flaring outwardly to a pair of feet, middle cross bar means for connecting the middle portion of the legs together and for acting as a stop for a rear wall of the handle and setting the distance between the rear wall of the handle and said feet to hold the barrel at the proper angle so that any pipet tube mounted in the barrel is held with its admitting-emitting tip end being lower than the level of its connecting end so that any liquid in the tube does not flow back through the tube and into the pipet gun, and a bottom cross bar connecting said feet together to give the legs stability, mounting a pipet tube on the pipet gun, clamping the stand to the pipet gun by mounting the clamping arms onto the pipet gun barrel to form a pipet gun assembly, placing the pipet gun assembly onto a top surface of a work table so that the pipet gun is upright an is supported by the stand and a heel of the pipet gun handle, setting the distance between the rear wall of the handle and said feet, holding the pipet tube at an attitude wherein the admitting-emitting tip end of the tube is below the level of the connecting end of the tube to prevent any liquid in the tube from flowing back through the tube into the gun, and preventing contamination of the pipet tube by holding and positioning the pipet gun so that the pipet tube does not touch the work table.

9. A pipet gun stand for supporting a pipet gun in upright position on a work table and for holding a pipet tube mounted in the pipet gun so that the pipet tube does not touch the work table on which the pipet gun rests and for holding a pipet tube mounted in the pipet gun so that the pipet tube is pointed downwardly and has its admitting-emitting tip end lower than its connecting end for preventing any liquid in the pipet tube from flowing back through the pipet tube and into the pipet gun, comprising a pair of resilient clamping arms connected together by a back channel, each said clamping arm having a facing surface, a pair of legs extending downwardly from the clamping arm and flaring outwardly to a pair of feet, middle cross bar means connecting the middle portions of the legs together and for acting as a stop for a rear wall of the handle and for setting a distance between the rear wall of the handle and said feet to hold the barrel at such an angle that said pipet tube mounted in the barrel is held with its admitting-emitting tip end being lower than the level of its connecting end so that any liquid in the tube does not flow back to the tube and into the pipet gun, and a bottom cross bar connecting said feet together to give the legs stability, the facing surface of each clamping arm including a ridge adapted to seat in a pair of grooves on the pipet gun barrel to connect the stand to the barrel.

* * * * *